J. HAUSER.
EMERGENCY BRAKE.
APPLICATION FILED OCT. 10, 1908.
917,598.
Patented Apr. 6, 1909.
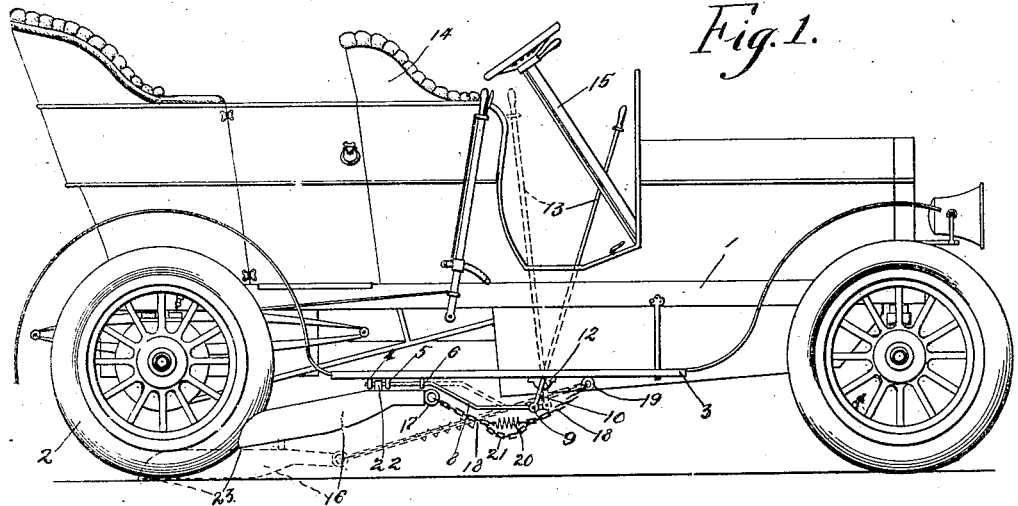
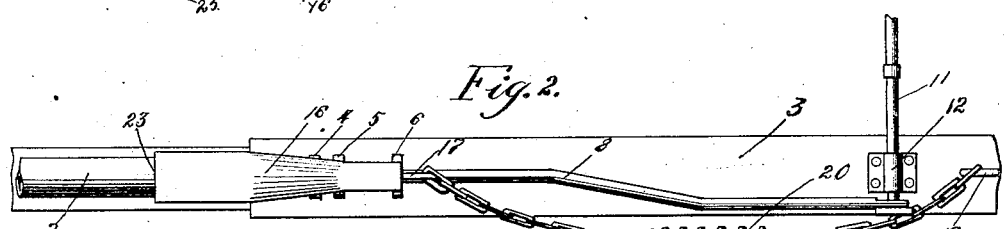
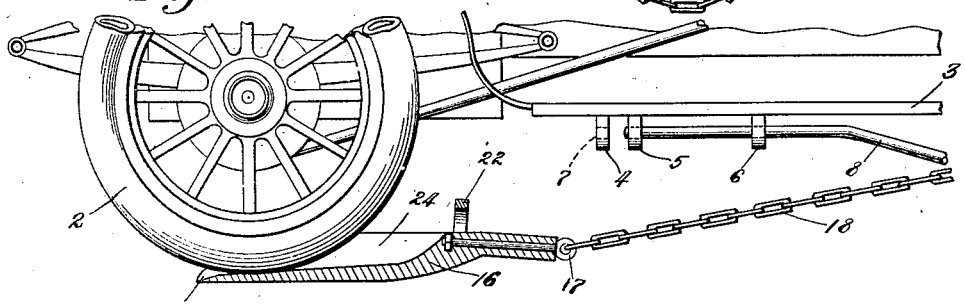
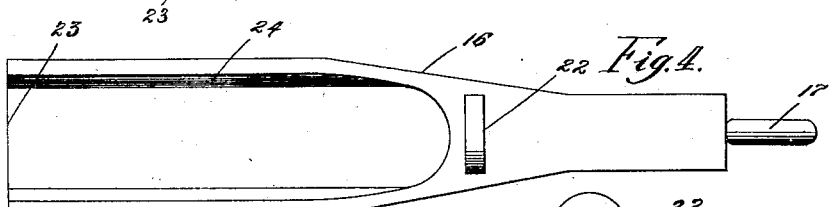
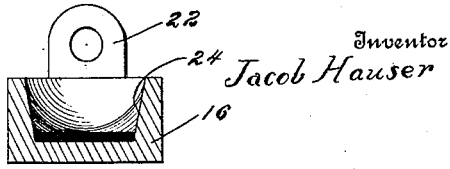
Witnesses
R. L. Farrington.
R. H. Butler.
Inventor
Jacob Hauser
By
Attorneys

UNITED STATES PATENT OFFICE.

JACOB HAUSER, OF SCOTTDALE, PENNSYLVANIA.

EMERGENCY-BRAKE.

No. 917,598.  Specification of Letters Patent.  Patented April 6, 1909.

Application filed October 10, 1908. Serial No. 457,097.

*To all whom it may concern:*

Be it known that I, JACOB HAUSER, a citizen of the United States of America, residing at Scottdale, in the county of Westmoreland and State of Pennsylvania, have invented certain new and useful Improvements in Emergency-Brakes, of which the following is a specification, reference being had therein to the accompanying drawing.

This invention relates to emergency brakes for automobiles and similar vehicles, and the object of my invention is the provision of novel means in connection with an automobile for retarding and eventually stopping the movement of the same should the chauffeur or driver lose control of the machine or should it be necessary to immediately stop the machine to prevent the occurrence of an accident.

My invention aims to provide novel shoes for the drive wheels of an automobile, the shoes being normally held in an inactive position, but easily and quickly placed in an active position by the driver of the automobile. To this end, I arrange the shoes beneath the running boards of an automobile and in the path of the drive wheels, the shoes and the mechanism for releasing the same not interfering with the operating mechanism of the automobile.

The detail construction entering into my invention will be hereinafter described and then specifically pointed out in the appended claims.

In the accompanying drawings:—Figure 1 is an elevation of an automobile equipped with my emergency brake, Fig. 2 is a bottom plan of a portion of the same, Fig. 3 is a longitudinal sectional view of one of the shoes of my brake in active position, relative to the automobile wheel, Fig. 4 is a plan of one of the shoes, and Fig. 5 is a cross sectional view of the same.

In the accompanying drawings, 1 designates the body of an automobile having drive wheels 2 and a running board 3 at each side of the automobile. The running boards 3 are provided with depending brackets 4, 5 and 6 having longitudinally alining openings 7 formed therein. Slidably mounted in the openings 7 of the brackets of each running board is a rod 8, which is bent downwardly and pivotally connected, as at 9, to the crank 10 of a transverse shaft 11, journaled in depending bearings 12 carried by the running boards 3. Mounted upon the shaft 11 is an operating lever 13, which extends upwardly through the body 1 of the automobile adjacent the driver's seat 14 thereof. The position of the lever 13 and the juxtaposition of the steering mechanism 15 permit of the driver of the vehicle easily manipulating the machine and the lever 13 in case of an emergency.

In connection with each drive wheel 2 I use a shovel-like brake shoe 16, said shoe having a forwardly extending eyebolt 17, which is connected by chains 18 to the eyebolts 19 carried by the running boards 3 of the automobile. In connection with the chains 18 coil springs 20 are used, these springs being connected to two of the links of each chain to maintain the slack portions 21, the object of which will presently appear.

The shoes 16 are provided with apertured lugs 22 and these lugs are adapted to fit between the apertured depending brackets 4 and 5, where said lugs are retained by the rods 8 as best shown in Fig. 1 of the drawings.

Should it be desired to drop the shoes 16 in front of the drive wheels 2, the driver of the machine swings the lever 13 to the position illustrated in dotted lines of Fig. 1, this lever through the medium of the crank shaft 11 withdrawing the rods 8 from the apertured brackets 4 and the apertured lugs 22, allowing the shoes to drop to the ground directly in front of the drive wheels 2, whereby said wheels will run upon the shoes 16. When the shoes 16 are first engaged by the drive wheels 2, the wheels will have a tendency to snap the chains 18, therefore I have interposed the spring 20, whereby the shoes 16 can gradually yield to the action of the wheels 2 for breaking or detaching the chains 18 or the parts to which said chains are connected.

The shoes 16 are made of strong and durable metal and are beveled, as at 23 and 24, to prevent the tires of the wheels 2 from being unthreaded when contacting with said shoes.

After the automobile has been brought to a stand still, the machine can be backed and the shoes 16 placed in their normal position beneath the running boards 3.

My emergency brake can be used in connection with an automobile when the ordinary brakes fail to act, whether the power is on or off. It will of course be understood that various parts of the emergency brake are made of a size according to the weight of the automobile in connection with which they are used.

While in the drawings forming a part of this application there is illustrated the preferred embodiments of my invention, it is to be understood that the same can be varied or changed as to shape, proportion and manner of assemblage without departing from the spirit of the invention.

Having now described my invention what I claim as new, is:—

1. In an emergency brake, the combination with an automobile body, the drive wheels thereof and the running boards, depending apertured brackets carried by said running boards, rods slidably mounted in said brackets, a crank shaft supported by said running boards and connecting with said rods, a lever mounted upon said crank shaft and extending upwardly above the floor of said automobile body, shoes detachably suspended upon said rods in front of said wheels, chains connecting said shoes with said running boards, and springs interposed in said chains for providing slack portions therein, substantially as described.

2. In an emergency brake, the combination with an automobile body, the drive wheels thereof and the running boards, of depending apertured brackets carried by said running boards, rods slidably mounted in said brackets, a crank shaft supported by said running boards and connecting with said rods, a lever mounted upon said crank shaft and extending upwardly above the floor of said automobile body, shoes detachably suspended upon said rods in front of said wheels, and chains connecting said shoes with said running boards.

3. In an emergency brake for automobiles, a brake shoe, means including a longitudinally-movable rod for detachably-suspending said shoe in an inactive position from the automobile, a crank-shaft carried by the automobile and connected at one end to said rod, a lever connected to said shaft for operating the same, a chain connecting the forward end of said brake shoe with the automobile, and a spring interposed in said chain with its ends connected to links of the chain to form slack in the chain, as and for the purpose described.

In testimony whereof I affix my signature in the presence of two witnesses.

JACOB HAUSER.

Witnesses:
  MAX H. SROLOVITZ,
  K. H. BUTLER.